United States Patent
Cameron et al.

(10) Patent No.: US 10,014,805 B2
(45) Date of Patent: Jul. 3, 2018

(54) METHOD AND APPARATUS FOR ADJUSTING MOTOR COMMUTATION PHASE AND PERIOD

(71) Applicant: The Boeing Company, Chicago, IL (US)

(72) Inventors: Douglas Conrad Cameron, Ladera Ranch, CA (US); Kevin T. Colangelo, Glendora, CA (US); Suhat Limvorapun, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/148,459

(22) Filed: May 6, 2016

(65) Prior Publication Data

US 2017/0324359 A1 Nov. 9, 2017

(51) Int. Cl.
| | |
|---|---|
| *H02P 9/18* | (2006.01) |
| *H02P 7/00* | (2016.01) |
| *H02P 6/182* | (2016.01) |
| *H02P 27/06* | (2006.01) |

(52) U.S. Cl.
CPC .............. *H02P 6/182* (2013.01); *H02P 27/06* (2013.01)

(58) Field of Classification Search
CPC ............... H02P 9/18; H02P 7/00; H02P 6/182
USPC ........................................................ 318/254
See application file for complete search history.

(56) References Cited

U.S. PATENT DOCUMENTS

| | | | | |
|---|---|---|---|---|
| 5,038,092 A | * | 8/1991 | Asano ............... | H02M 7/53875 318/799 |
| 5,416,885 A | * | 5/1995 | Sakoh ................ | H02P 7/2885 318/650 |
| 5,497,326 A | * | 3/1996 | Berland ............. | B60N 2/0244 318/468 |
| 6,055,389 A | | 4/2000 | Takahashi | |
| 6,424,798 B1 | | 7/2002 | Kitamine | |
| 6,433,502 B2 | | 8/2002 | Oku | |
| 6,462,491 B1 | * | 10/2002 | Iijima ................ | H02P 9/18 318/400.09 |

(Continued)

FOREIGN PATENT DOCUMENTS

| | | |
|---|---|---|
| JP | S61116905 A | 6/1986 |
| WO | WO2015194013 A1 | 12/2015 |

OTHER PUBLICATIONS

Keeping "Controlling Sensorless, BLDC Motors via Back EMF," Contributed by Electronic Products, Digi-Key Electronics, Jun. 19, 2013, 6 pages, accessed May 4, 2016, http://www.digikey.com/en/articles/techzone/2013/jun/controlling-sensorless-bldc-motors-via-back-emf.

(Continued)

*Primary Examiner* — Jorge L Carrasquillo
*Assistant Examiner* — Cortez Cook
(74) *Attorney, Agent, or Firm* — Yee & Associates, P.C.

(57) ABSTRACT

A method and apparatus for controlling commutation of a motor. A voltage is measured at each of a plurality of windings of a motor using an electric circuit. A controller computes an overall back electromotive force for the motor using the voltage measured at each winding in the plurality of windings. The controller generates a result having either a first value or a second value based on the overall back electromotive force. The controller adjusts the commutation (Continued)

phase and the commutation period of the motor using the result.

19 Claims, 8 Drawing Sheets

(56) References Cited

U.S. PATENT DOCUMENTS

| | | | |
|---|---|---|---|
| 9,742,341 | B2 | 8/2017 | Watabu et al. |
| 2008/0231217 | A1* | 9/2008 | Zhong .................... H02P 6/181 318/400.07 |
| 2009/0033357 | A1 | 2/2009 | Lindsey et al. |
| 2010/0192788 | A1 | 8/2010 | Tanaka et al. |
| 2011/0037423 | A1* | 2/2011 | Koda ..................... H02P 6/15 318/400.37 |
| 2011/0187308 | A1 | 8/2011 | Suhama et al. |
| 2012/0013280 | A1 | 1/2012 | Kern et al. |
| 2013/0063055 | A1 | 3/2013 | Araki et al. |
| 2014/0265967 | A1* | 9/2014 | Brown ..................... H02P 7/00 318/400.27 |
| 2015/0006933 | A1 | 1/2015 | Park et al. |
| 2015/0180389 | A1 | 6/2015 | Ogawa |
| 2015/0202966 | A1 | 7/2015 | Oyama et al. |
| 2015/0333669 | A1 | 11/2015 | Alexander et al. |
| 2016/0065073 | A1 | 3/2016 | Katsuki et al. |

OTHER PUBLICATIONS

Colangelo et al., "Management of Motor Regeneration," U.S. Appl. No. 15/148,562, filed May 6, 2016, 35 pages.

Extended European Search Report, dated Sep. 14, 2017, regarding Application No. 17167159.7 , 6 pages.

Office Action, dated May 17, 2017, regarding U.S. Appl. No. 15/148,562, 29 pages.

Final Office Action, dated Nov. 30, 2017, regarding U.S. Appl. No. 15/148,562, 24 pages.

* cited by examiner

METHOD AND APPARATUS FOR ADJUSTING MOTOR COMMUTATION PHASE AND PERIOD

BACKGROUND INFORMATION

1. Field

The present disclosure relates generally to motors and, in particular, to the commutation of motors. Still more particularly, the present disclosure relates to a method and apparatus for adjusting a commutation phase and a commutation period for a motor using back electromotive force.

2. Background

Commutation is the process of switching current in the phases of a motor to generate motion. Different types of motors may be commutated in different ways. For example, brushless direct current (BLDC) motors and permanent magnet synchronous motors are two types of electric motors commonly used in complex electromechanical systems, vehicles, and other types of platforms.

Electric motors may be commutated using different types of commutation, such as trapezoidal commutation, modified six step commutation, or sinusoidal commutation. Trapezoidal commutation is one of the simpler forms of commutation. Trapezoidal commutation may be achieved using devices such as, for example, without limitation, Hall effect sensors or other types of devices for directly measuring rotor position in a motor. However, using these types of devices to perform commutation may require connecting additional components to the motor, thereby increasing a weight of the motor more than desired. In some cases, these types of devices may cause undesired torque ripple.

Sensorless commutation that does not use sensors to directly measure rotor position may be used with some motors. Some currently available methods of sensorless commutation include detecting a back electromotive force for each of the phases of the motor and then computing or estimating the zero-point crossings of the back electromotive force to determine commutation timing. However, these methods may be sensitive to circuit noise, which can lead to a pattern of delayed and early commutations. Early commutations and delayed commutations may reduce the overall performance of the motor and associated circuitry. Therefore, it would be desirable to have a method and apparatus that take into account at least some of the issues discussed above, as well as other possible issues.

SUMMARY

In one illustrative embodiment, an apparatus comprises an electric circuit and a controller connected to the electric circuit. The electric circuit measures a voltage at each of a plurality of windings of a motor and controls commutation of the motor. The controller computes an overall back electromotive force for the motor using the voltage measured at each winding in the plurality of windings. The controller generates a result having either a first value or a second value based on the overall back electromotive force. The controller adjusts the commutation phase and the commutation period of the motor using the result.

In another illustrative embodiment, a method is provided for controlling commutation of a motor. A voltage is measured at each of a plurality of windings of a motor using an electric circuit. A controller computes an overall back electromotive force for the motor using the voltage measured at each winding in the plurality of windings. The controller generates a result having either a first value or a second value based on the overall back electromotive force. The controller adjusts the commutation phase and the commutation period of the motor using the result.

In yet another illustrative embodiment, a method is provided for performing sensorless commutation of a motor. A first phase voltage, a second phase voltage, and a third phase voltage measured at a first winding, a second winding, and a third winding, respectively, of the motor are received from a voltage measurement system that is connected to ground. An overall back electromotive force for the motor is computed using the first phase voltage, the second phase voltage, and the third phase voltage. A result is generated having a first value when the overall back electromotive force is not positive and having a second value when the overall back electromotive force is positive. A phase counter and a period adjustment are adjusted using the result. A new commutation period for the motor is computed using the period adjustment and a baseline commutation period for the motor. The motor is commutated when the phase counter is greater than the new commutation period.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments take into account different considerations. For example, the illustrative embodiments take into account that it may be desirable to perform commutation for a motor in a manner that does not add undesired weight to the motor, cause current surges, or create undesired noise. In particular, the illustrative embodiments take into account that it may be desirable to perform sensorless trapezoidal commutation in a manner that improves commutation timing and an overall performance of the motor.

Thus, the illustrative embodiments provide a method and apparatus for sensorless commutation of electric motors. In particular, measured phase voltages are used by a controller to compute an overall back electromotive force in a manner that reduces ground bounce. The overall back electromotive force is then used to generate a result, which may be used to adjust a commutation period and a commutation phase of the motor. In particular, the result may be used to cause the commutation phase to be lagged and the commutation period to be increased when the overall back electromotive force is negative or zero or, in other words, not positive. Further the result may be used to cause the commutation phase to be advanced and the commutation period to be decreased when the overall back electromotive force is positive. The method and apparatus provided by the illustrative embodiments helps improve consistency in commutation timing, thus maximizing efficiency of motor performance, reducing surge currents, and reducing noise.

Figure 1:
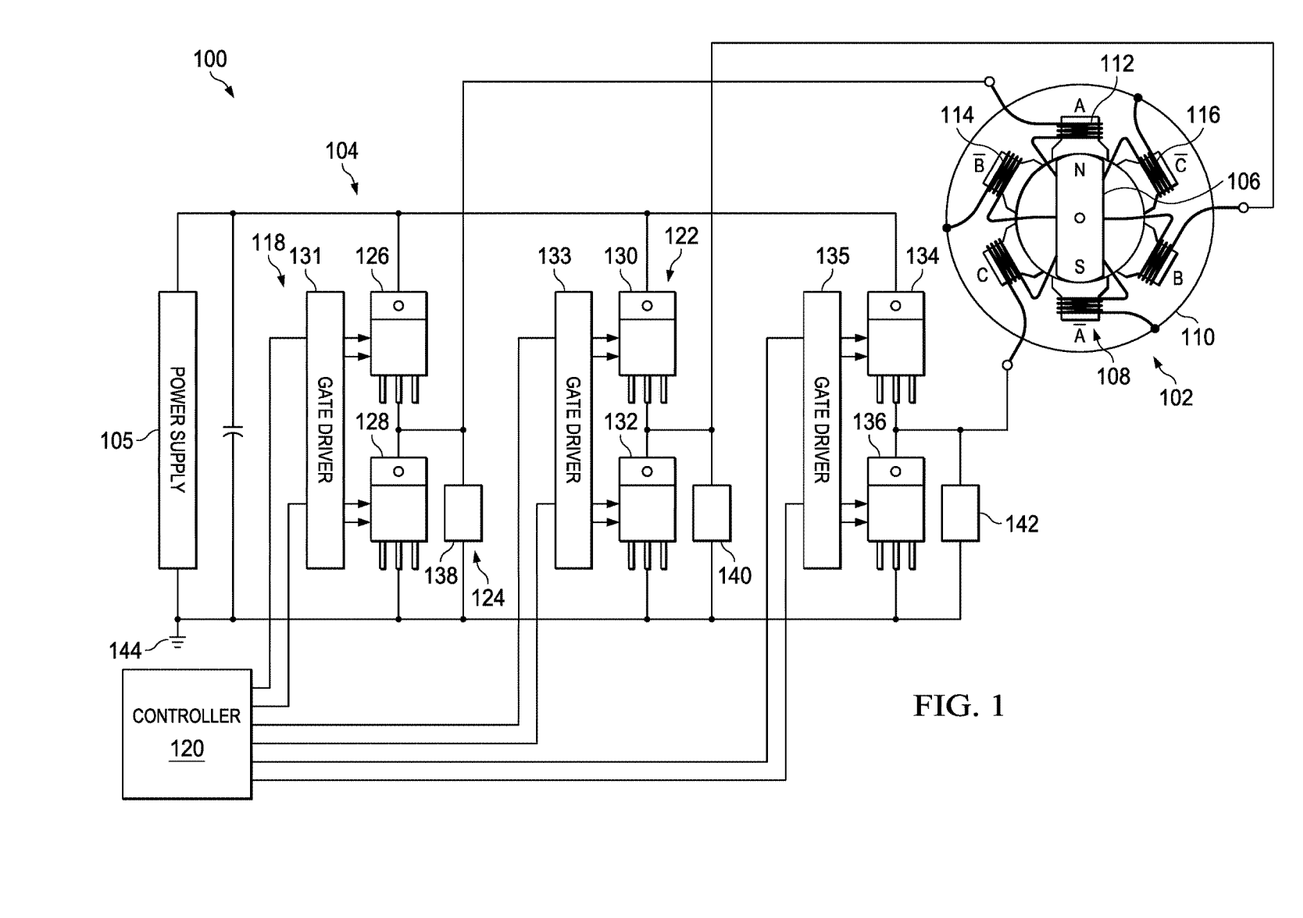
FIG. 1 is an illustration of a motor system in accordance with an illustrative embodiment.

Referring now to the figures and, in particular, with reference to FIG. 1, an illustration of a motor system is depicted in accordance with an illustrative embodiment. In this illustrative example, motor system 100 includes motor 102 and sensorless commutation system 104.

Motor 102 is an electric motor in this illustrative example. In particular, motor 102 is a brushless direct current (BLDC) motor having three phases. Power supply 105 provides power to motor 102. In this illustrative example, power supply 105 takes the form of a direct current power source.

Motor 102 includes rotor 106, stator 108, and plurality of windings 110. In this illustrative example, plurality of windings 110 includes first winding 112, second winding 114, and third winding 116. Each of these windings corresponds to a different phase for motor 102.

As depicted, sensorless commutation system 104 is connected to motor 102. In particular, sensorless commutation system 104 connects to plurality of windings 110. Sensorless commutation system 104 includes electric circuit 118, which is connected to motor 102, and controller 120.

Electric circuit 118 includes inverter 122 and voltage measurement system 124. Inverter 122 is used to control the commutation of motor 102. In particular, inverter 122 controls the timing of commutation for motor 102.

As depicted, inverter 122 includes transistor 126, transistor 128, transistor 130, transistor 132, transistor 134, and transistor 136. In this illustrative example, each of transistor 126, transistor 128, transistor 130, transistor 132, transistor 134, and transistor 136 takes the form of a metal-oxide semiconductor field-effect transistor. In this illustrative example, inverter 122 also includes gate driver 131, gate driver 133, and gate driver 135. These gate drivers may control when the various transistors of inverter 122 are switched to an on state and switched to an off state.

Voltage measurement system 124 is used to measure the voltage at each of plurality of windings 110. As depicted, voltage measurement system 124 includes voltage divider 138, voltage divider 140, and voltage divider 142. Voltage divider 138, voltage divider 140, and voltage divider 142 are connected to first winding 112, second winding 114, and third winding 116, respectively. Further, each of voltage divider 138, voltage divider 140, and voltage divider 142 is connected to ground 144. Ground 144 is an electrical ground.

Voltage divider 138 measures the voltage at first winding 112. Voltage divider 140 measures the voltage at second winding 114. Voltage divider 142 measures the voltage at third winding 116.

In this illustrative example, controller 120 uses the voltage measured at each of plurality of windings 110 to compute a back electromotive force for each of the three phases of motor 102. For example, controller 120 may compute a first back electromotive force for the first phase of motor 102, a second back electromotive force for the second phase of motor 102, and a third back electromotive force for the third phases of motor 102.

Controller 120 then uses the first back electromotive force, the second back electromotive force, and the third back electromotive force to compute an overall back electromotive force. In this manner, controller 120 may use one or more digital algorithms to compute overall back electromotive force based on the voltages measured by voltage measurement system 124. Thus, the quantity of hardware components used to control the commutation of motor 102 may be reduced, thereby reducing the overall weight of motor system 100.

Controller 120 generates a result based on the overall back electromotive force. The result may have either a first value or a second value. For example, without limitation, controller 120 may generate the result having the first value when the overall back electromotive force is negative and having the second value when the overall back electromotive force is positive.

In this illustrative example, controller 120 uses the result generated to adjust both a commutation phase and a commutation period of motor 102. These adjustments affect how controller 120 controls gate driver 131, gate driver 133, and gate driver 135, thereby controlling when each of transistor 126, transistor 128, transistor 130, transistor 132, transistor 134, and transistor 136 is switched between an on state and an off state. Controlling the on state and the off state for each of the transistors controls commutation of motor 102.

Sensorless commutation system 104 is configured to provide improved phase alignment between the current in plurality of windings 110 and the overall back electromotive force. The output power of motor 102 may be maximized when this current and overall back electromotive force are aligned in phase. Further, sensorless commutation system 104 improves the timing of commutation of motor 102.

The configuration of electric circuit 118 described above and the functions performed by controller 120 reduce the creation of surge currents and provide smoother current waveforms from commutation to commutation of motor 102. By reducing surge currents and providing smoother current waveforms between commutations, sensorless commutation system 104 may improve the efficiency of motor 102, help reduce the heat generated by motor 102, reduce or eliminate overcurrent, and increase the output power of motor 102. Further, the simple configuration of electric circuit 118 described above and the functions performed by controller 120 allow efficient sensorless commutation to be provided at a lower cost.

Figure 2:
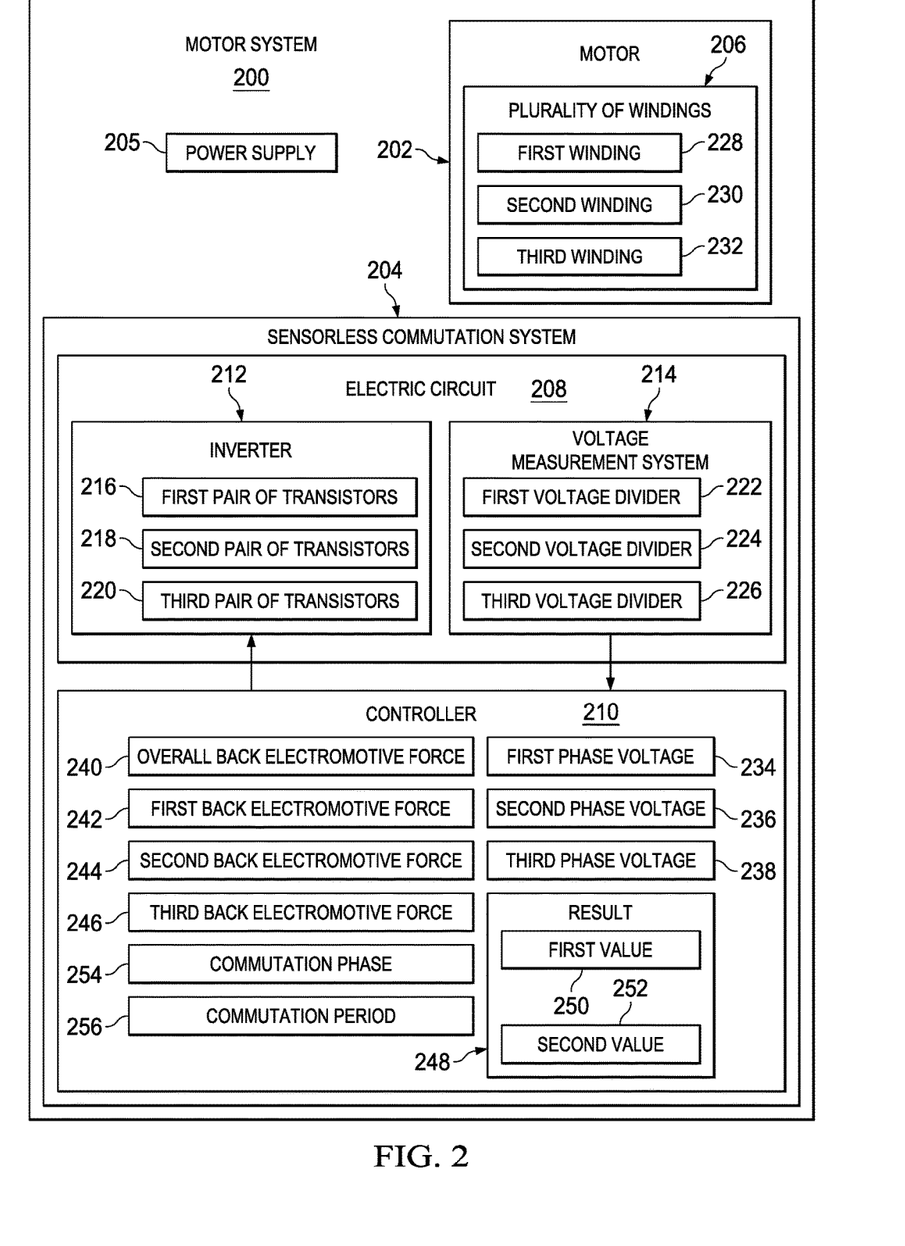
FIG. 2 is an illustration of a motor system in the form of a block diagram in accordance with an illustrative embodiment.

With reference now to FIG. 2, an illustration of a motor system is depicted in the form of a block diagram in accordance with an illustrative embodiment. In this illustrative example, motor system 200 includes motor 202, sensorless commutation system 204, and power supply 205. Motor system 100, motor 102, sensorless commutation system 104, and power supply 105 in FIG. 1 are examples of implementations for motor system 200, motor 202, sensorless commutation system 204, and power supply 205, respectively, in FIG. 2.

Motor 202 is an electric motor that may take different forms. Depending on the implementation, motor 202 may take the form of a brushless direct current motor, a permanent magnet synchronous motor, or some other type of electric motor. Power supply 205 provides power to motor 202. In some illustrative examples, power supply 205 is a direct current power supply.

As depicted, motor 202 has plurality of windings 206. In one illustrative example, motor 202 is a three-phase motor with three windings for the three different phases. For example, without limitation, the first phase may be phase A, the second phase may be phase B, and the third phase may be phase C.

Sensorless commutation system 204 is connected to motor 202. As depicted, sensorless commutation system 204 includes electric circuit 208 and controller 210. Electric circuit 208 measures a voltage at each winding in plurality of windings 206 of motor 202 and controls the commutation of motor 202. Controller 210 is connected to electric circuit 208.

Electric circuit 208 includes inverter 212 and voltage measurement system 214, both of which are connected to plurality of windings 206 and ground. This ground may be an electrical ground. Electric circuit 118, controller 120, inverter 122, and voltage measurement system 124 in FIG. 1 may be examples of implementations for electric circuit 208, controller 210, inverter 212, and voltage measurement system 214, respectively, in FIG. 2.

In one illustrative example, inverter 212 may take the form of a three-phase inverter. For example, without limitation, inverter 212 may include first pair of transistors 216, second pair of transistors 218, and third pair of transistors 220. Each of these pairs of transistors may be connected in a half-bridge configuration in electric circuit 208 to form a three-phase inverter. Inverter 212 controls the timing of commutation for motor 202.

Voltage measurement system 214 is connected to inverter 212 and motor 202. Voltage measurement system 214 is used to measure the voltage at each winding in plurality of windings 206. In one illustrative example, voltage measurement system 214 may include first voltage divider 222, second voltage divider 224, and third voltage divider 226, each of which is referenced to ground.

In this illustrative example, first voltage divider 222 is connected between ground and first winding 228 in plurality of windings 206. Second voltage divider 224 is connected between ground and second winding 230 in plurality of windings 206. Further, third voltage divider 226 is connected between ground and third winding 232 in plurality of windings 206.

First voltage divider 222 measures first phase voltage 234 at first winding 228. Second voltage divider 224 measures second phase voltage 236 at second winding 230. Third voltage divider 226 measures third phase voltage 238 at third winding 232. First phase voltage 234, second phase voltage 236, and third phase voltage 238 are sent to controller 210 as voltage signals. Controller 210 uses these voltage signals to compute overall back electromotive force 240 (Vbemf). Controller 210 uses first phase voltage 234, second phase voltage 236, and third phase voltage 238 as inputs into an algorithm that outputs overall back electromotive force 240.

In particular, controller 210 computes first back electromotive force 242 for a first phase of motor 202. Controller 210 computes second back electromotive force 244 for a second phase of motor 202. Further, controller 210 computes third back electromotive force 246 for a third phase of motor 202. Each of first back electromotive force 242, second back electromotive force 244, and third back electromotive force 246 is computed using a different combination of first phase voltage 234, second phase voltage 236, and third phase voltage 238.

In one illustrative example, controller 210 performs the following computations:

$$Vas = Va - [(Vb+Vc)/2]; \quad (1)$$

$$Vbs = Vb - [(Va+Vc)/2]; \quad (2)$$

$$Vcs = Vc - [(Va+Vb)/2]; \quad (3)$$

where Va is first phase voltage 234, Vb is second phase voltage 236, Vc is third phase voltage 238, Vas is first back electromotive force 242, Vbs is second back electromotive force 244, and Vcs is third back electromotive force 246.

Each of first phase voltage 234, second phase voltage 236, and third phase voltage 238 may be contaminated by ground bounce, which may also be referred to as ground bounce noise. For a particular phase of motor 202, subtracting the average of the other two phase voltages from the phase voltage corresponding to the particular phase reduces the effect of the ground bounce in the computed back electromotive force for that particular phase. For example, by subtracting the average of second phase voltage 236 and third phase voltage 238 from first phase voltage 234, the effect of ground bounce in the resulting computation of first back electromotive force 242 for the first phase of motor 202 is reduced.

Controller 210 uses first back electromotive force 242, second back electromotive force 244, and third back electromotive force 246 to determine overall back electromotive force 240. In particular, controller 210 selects one of first back electromotive force 242, second back electromotive force 244, and third back electromotive force 246 to be overall back electromotive force 240. Controller 210 makes this selection based on the current commutation state of motor 202.

For example, inverter 212 may provide six-step commutation of motor 202. In other words, motor 202 may have six commutation states. Controller 210 may make the following selections:

$$\text{Commutation state } A-B \rightarrow Vbemf = Vcs; \quad (4)$$

$$\text{Commutation state } B-A \rightarrow Vbemf = -Vcs; \quad (5)$$

$$\text{Commutation state } B-C \rightarrow Vbemf = Vas; \quad (6)$$

$$\text{Commutation state } C-B \rightarrow Vbemf = -Vas; \quad (7)$$

$$\text{Commutation state } A-C \rightarrow Vbemf = Vbs; \text{ and} \quad (8)$$

$$\text{Commutation state } C-A \rightarrow Vbemf = -Vbs. \quad (9)$$

The computation of overall back electromotive force 240 by controller 210 using the algorithm described above may be performed for both low duty cycles and high duty cycles. The duty cycle for motor 202 is the percentage of one period in which motor 202 is active or turned on. For example, without limitation, the algorithm described above may work well for duty cycles ranging between about 8 percent and about 100 percent.

Once overall back electromotive force 240 has been computed, controller 210 generates result 248 having either first value 250 or second value 252 based on overall back electromotive force 240. For example, without limitation, when overall back electromotive force 240 is negative, first value 250 for result 248 may be a negative one (−1). Further, when overall back electromotive force 240 is positive, second value 252 for result 248 may be a positive one (+1).

Controller 210 uses result 248 to adjust commutation phase 254 and commutation period 256 of motor 202. These adjustments of commutation phase 254 and commutation period 256 of motor 202 improve the timing of the commutation of motor 202. In particular, these adjustments are used to control the operation of inverter 212, to thereby control when motor 202 commutates.

Sensorless commutation system 204 provides a system for commutating motor 202 that more closely aligns the motor winding current with overall back electromotive force 240. In this manner, the output power of motor 202 may be increased.

In these illustrative examples, controller 210 may be implemented in software, hardware, firmware, or a combination thereof. When software is used, the operations performed by controller 210 may be implemented using, for example, without limitation, program code configured to run on a processor unit. When firmware is used, the operations performed by controller 210 may be implemented using, for example, without limitation, program code and data and stored in persistent memory to run on a processor unit.

When hardware is employed, the hardware may include one or more circuits that operate to perform the operations performed by controller 210. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

The illustration of motor system 200 in FIG. 2 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
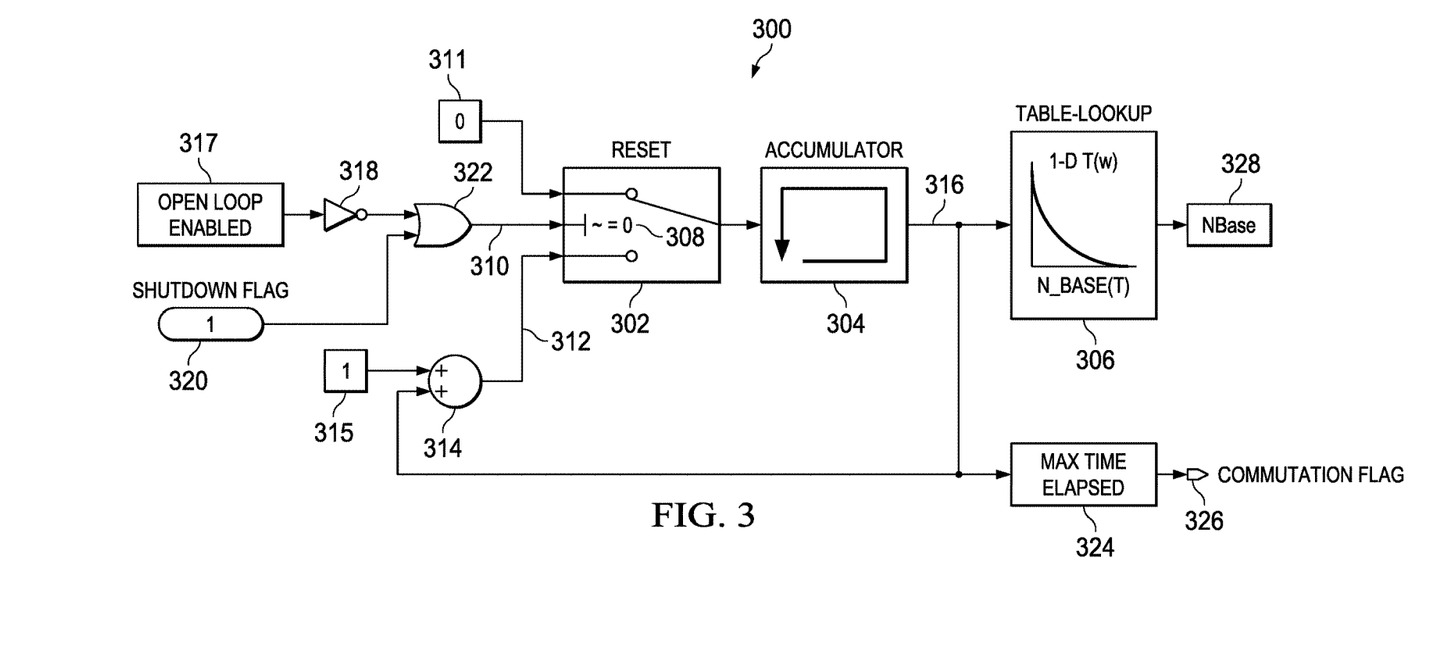
FIG. 3 is an illustration of a control flow diagram for an initialization stage for a motor in accordance with an illustrative embodiment.

With reference now to FIG. 3, an illustration of a control flow diagram for an initialization stage for a motor is depicted in accordance with an illustrative embodiment. In this illustrative example, control flow diagram 300 describes the open-loop initialization algorithm that may be used to start up a motor, such as motor 202 in FIG. 2, from a stopped state or stopped position. Control flow diagram 300 describe operations that may be performed by controller 210 in FIG. 2.

In this illustrative example, control flow diagram 300 uses binary inputs and outputs. In particular, each input and output is either a low value, which may be 0, or a high value, which may be 1. Control flow diagram 300 includes reset switch 302, accumulator 304, and table-lookup 306. Reset switch 302 uses condition 308 to generate an output based on OR result 310, constant 311, and sum result 312 of adder 314. In particular, reset switch 302 determines whether OR result 310 meets condition 308 of being not equal to 0.

If OR result 310 meets condition 308, reset switch 302 outputs the value of constant 311 to accumulator 304. Constant 311 is 0 in this illustrative example. If OR result 310 does not meet condition 308, reset switch 302 outputs sum result 312 of adder 314 to accumulator 304. Sum result 312 is the output generated by adder 314 summing constant 315 and output 316 of accumulator 304. Accumulator 304 tracks the inputs received from reset switch 302.

In this illustrative example, the inverse of the value of open loop enabled 317 is output by NOT gate 318. If either this output or the value of shutdown flag 320 is 1, then OR gate 322 generates a 1 as OR result 310, which is sent to reset switch 302. The value of open loop enabled 317 is 0 when the initialization stage has been completed and is 1 when the initialization stage is in progress.

The value of shutdown flag 320 is 0 when motor 202 from FIG. 2 is turned on and is 1 when motor 202 from FIG. 2 is turned off or otherwise shut down. In these illustrative examples, a flag, such as shutdown flag 320, may either be set or not set. In other words, at any given point in time, the flag may have either a value corresponding to a set state or a value corresponding to a not set state. In these examples, a flag has a value of 0 when the flag is not set and some other value when the flag is set. This other value may be 1 when the flag value is established by a bit number or some positive voltage level when the flag value is established by a voltage level.

If at any point in time, output 316 of accumulator 304 reaches the value of maximum time elapsed 324, then commutation flag 326 is given a value of 1. If output 316 has not yet reached the value of maximum time elapsed 324, then commutation flag 326 has a value of 0. Maximum time elapsed 324 may have a value sufficient to allow proper startup of motor 202. Once commutation flag 326 is given the value of 1, the initialization stage is considered complete and the commutation stage of motor 202 is entered. This commutation stage may continue until motor 202 is shut down or turned off.

Further, output 316 from accumulator 304 may also be sent into table-lookup 306 to generate Nbase 328. Nbase 328 may be an estimated commutation period that will serve as the baseline commutation period for motor 202.

Figure 4:
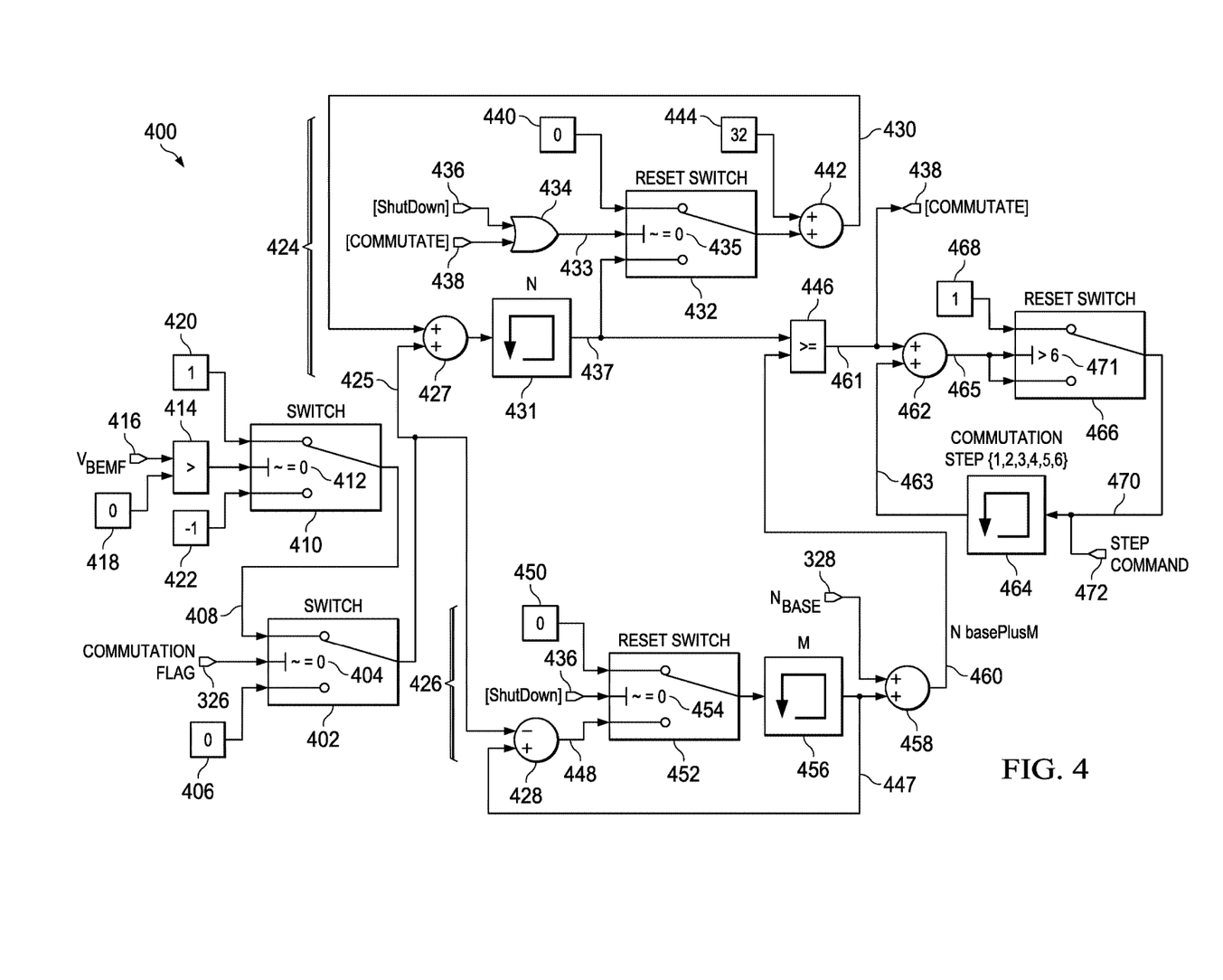
FIG. 4 is an illustration of a control flow diagram for adjusting a commutation phase and a commutation period in accordance with an illustrative embodiment.

With reference now to FIG. 4, an illustration of a control flow diagram for adjusting a commutation phase and a commutation period is depicted in accordance with an illustrative embodiment. In particular, control flow diagram 400 may describe an example of one manner in which commutation phase 254 and commutation period 256 for motor 202 in FIG. 2 may be adjusted. Control flow diagram 400 describes operations that may be performed by controller 210 in FIG. 2.

In this illustrative example, control flow diagram 400 includes switch 402 having condition 404. Switch 402 receives commutation flag 326 from FIG. 3 as an input, as well as constant 406 and result 408 of switch 410. Switch 402 determines whether commutation flag 326 meets condition 404 of not being equal to 0. Commutation flag 326 has a value of 1 when motor 202 is in a commutation stage and a value of 0 when motor 202 is in an initialization stage.

If commutation flag 326 meets condition 404, switch 402 outputs result 408. Otherwise, switch 402 outputs the value of constant 406. In this illustrative example, constant 406 is 0. In this manner, switch 402 outputs result 408 from switch 410 when in the commutation stage and outputs 0 when in the initialization stage.

Switch 410 has condition 412. Switch 410 determines whether the output of greater than gate 414 meets condition 412 of not being equal to 0. The output of greater than gate 414 is 1 if overall back electromotive force 416 is greater than constant 418, which is 0. Overall back electromotive force 416 may be, for example, the value of overall back electromotive force 240 computed by controller 210 in FIG. 2.

If the output of greater than gate 414 meets condition 412, switch 410 outputs positive increment 420, which is +1. Otherwise, switch 410 outputs negative increment 422, which is −1. In other words, switch 410 allows negative increment 422 to pass through as the output of switch 410. In one illustrative example, positive increment 420 and negative increment 422 may take the form of constants or voltage levels. For example, without limitation, positive increment 420 may take the form of a voltage output level that approximates a 1, while negative increment 422 may take the form of a voltage output level that approximates a −1.

Positive increment 420 is an example of one implementation for second value 252 in FIG. 2. Negative increment 422 is an example of one implementation for first value 250 in FIG. 2.

In this manner, result 408 generated by switch 410 is an example of one implementation for result 248 in FIG. 2. Switch 410 outputs +1 when overall back electromotive force 416 is positive and outputs −1 when overall back electromotive force 416 is negative or equal to zero.

Portion 424 of control flow diagram 400 illustrates how result 408 is used to adjust commutation phase, while portion 426 of control flow diagram 400 illustrates how result 408 is used to adjust commutation period. In particular, result 408 is output from switch 402 as long as commutation flag 326 has a value of 1, indicating that motor 202 is in the commutation stage.

Switch 402 sends output 425 to adder 427 of portion 424 and subtractor 428 of portion 426. Reset switch 432 determines whether result 433 of OR gate 434 meets condition 435 of being not equal to 0. Or gate 434 determines whether either the value of shutdown command 436 or the value of commutate command 438 is 1. The value of shutdown command 436 is 0 when motor 202 is not to be shut down and is 1 when motor 202 is to be shut down. The value of commutate command 438 is 1 when it is time to commutate motor 202 and is 0 otherwise.

If condition 435 is met, reset switch 432 outputs constant 440. Otherwise, if condition 435 is not met, reset switch 432 sends phase counter 437 that is output from accumulator 431 to adder 442. Phase counter 437 is a counter that is used for the adjustment of commutation phase for motor 202. Adder 442 adds the output from reset switch 432 to constant 444 to generate sum result 430, which is sent to adder 427 as described above. Adder 427 sums output 425 with sum result 430 to generate an output that is sent to accumulator 431. Accumulator 431 uses the output from adder 427 to update phase counter 437. Accumulator 431 sends phase counter 437 to logic gate 446 for further processing.

With reference now to portion 426 of control flow diagram 400, output 425 from switch 402 is sent to subtractor 428. Subtractor 428 subtracts output 425 from period adjustment 447 to generate sum result 448. Sum result 448 and constant 450, which is 0, are sent to reset switch 452. Reset switch 452 determines whether the value of shutdown command 436 meets condition 454 of being not equal to 0. If condition 454 is met, reset switch 452 sends constant 450 as output to accumulator 456. Otherwise, if condition 454 is not met, reset switch 452 sends sum result 448 as output to accumulator 456.

Accumulator 456 tracks the output of reset switch 452 over time to update period adjustment 447. Period adjustment 447 is a variable that is used to adjust the baseline commutation period for motor 202. Accumulator 456 sends period adjustment 447 to adder 458 and subtractor 428. Subtractor 428 updates period adjustment 447 with the value of output 425. In particular, subtractor 428 subtracts output 425 from period adjustment 447.

Adder 458 sums period adjustment 447 with Nbase 328 from FIG. 3 to generate new commutation period 460. Thus, the baseline commutation period identified for motor 202 in FIG. 3 is adjusted by the period adjustment 447 to generate new commutation period 460.

Logic gate 446 compares phase counter 437 to new commutation period 460 to determine whether phase counter 437 is greater than or equal to new commutation period 460. If phase counter 437 is greater than or equal to new commutation period 460, logic gate 446 sends a value of 1 to commutate command 438 and to adder 462. In other words, when phase counter 437 reaches new commutation period 460 during a given cycle, commutate command 438 is updated with a value of 1, thereby indicating that it is time to commutate motor 202. Otherwise, if phase counter 437 is less than new commutation period 460, a value of 0 is sent to commutate command 438, indicating that it is not yet time to commutate motor 202.

Adder 462 sums output 461 from logic gate 446 with step counter 463 being tracked by step accumulator 464 to generate sum result 465. Sum result 465 is sent to reset switch 466 for processing. If sum result 465 meets condition 471, meaning that sum result 465 is greater than 6, then reset switch 466 outputs constant 468, which is 1. If sum result 465 is not greater than 6, then reset switch 466 simply outputs sum result 465 as output 470, which is then sent to step accumulator 464. Step accumulator 464 uses output 470 to update step counter 463. Step counter 463 tracks the various commutation states of motor 202. These commutation states are also referred to as commutation steps for motor 202.

Further, output 470 is also set to step command 472. Step command 472 initiates a step command based on output 470. For example, output 470 may have a value of 1, 2, 3, 4, 5, or 6, each of which may correspond to a different commutation state for motor 202. Step command 472 initiates a step command that determines the next commutation state for motor 202 based on output 470.

The illustrations in FIGS. 3-4 are not meant to imply physical or architectural limitations to the manner in which an illustrative embodiment may be implemented. Other components in addition to or in place of the ones illustrated may be used. Some components may be optional.

Figure 5:
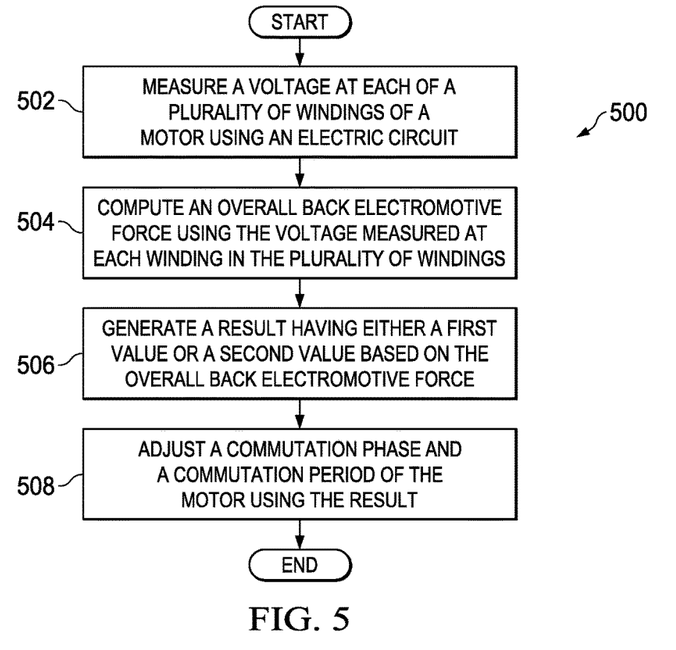
FIG. 5 is an illustration of a process for controlling commutation of a motor in the form of a flowchart in accordance with an illustrative embodiment.

With reference now to FIG. 5, an illustration of a process for controlling commutation of a motor is depicted in the form of a flowchart in accordance with an illustrative embodiment. Process 500 illustrated in FIG. 5 may be implemented using sensorless commutation system 204 in FIG. 2 or sensorless commutation system 104 in FIG. 1.

Process 500 may begin by measuring a voltage at each of a plurality of windings of a motor using an electric circuit (operation 502). An overall back electromotive force may then be computed using the voltage measured at each winding in the plurality of windings (operation 504).

Thereafter, a result is generated having either a first value or a second value based on the overall back electromotive force (operation 506). Then, a commutation phase and a commutation period of the motor is adjusted using the result (operation 508), with process 500 terminating thereafter.

Figure 6:
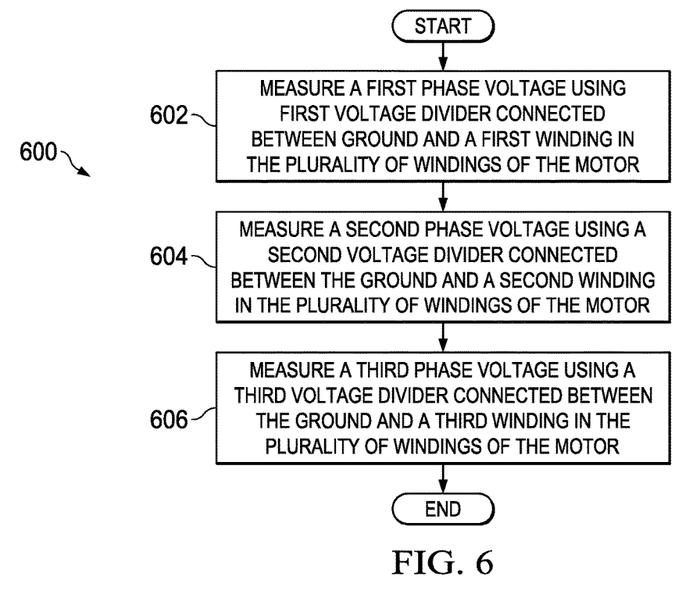
FIG. 6 is an illustration of a process for controlling commutation of a motor in the form of a flowchart in accordance with an illustrative embodiment.

With reference now to FIG. 6, an illustration of a process for controlling commutation of a motor is depicted in the form of a flowchart in accordance with an illustrative embodiment. Process 600 illustrated in FIG. 6 may be implemented using sensorless commutation system 204 in FIG. 2 or sensorless commutation system 104 in FIG. 1. Further, process 600 may be used to implement operation 502 in process 500 in FIG. 5.

Process 600 may begin by measuring a first phase voltage using a first voltage divider connected between ground and a first winding in the plurality of windings of the motor (operation 602). In operation 602, the first winding corresponds to a first phase, which may be, for example, phase A. Next, a second phase voltage is measured using a second voltage divider connected between the ground and a second winding in the plurality of windings of the motor (operation 604). In operation 604, the second winding corresponds to a second phase, which may be, for example, phase B.

A third phase voltage is measured using a third voltage divider connected between the ground and a third winding in the plurality of windings of the motor (operation 606), with process 600 terminating thereafter. In operation 606, the third winding corresponds to a third phase, which may be, for example, phase C.

Figure 7:
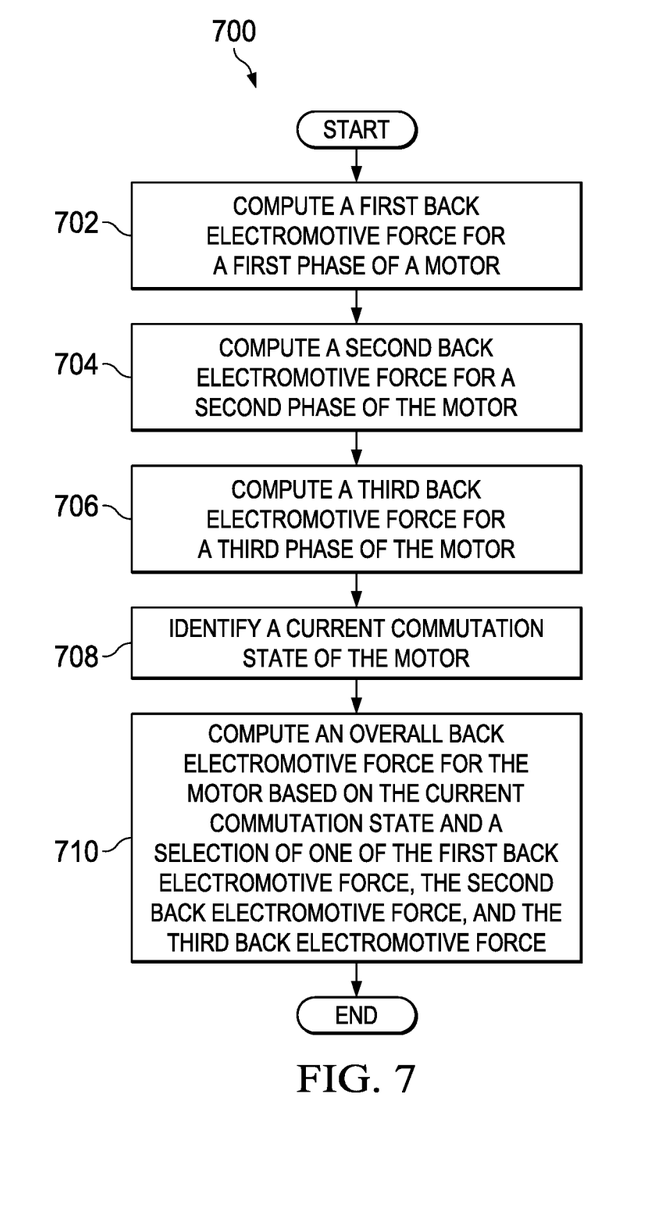
FIG. 7 is an illustration of a process for computing an overall back electromotive force in the form of a flowchart in accordance with an illustrative embodiment.

With reference now to FIG. 7, an illustration of a process for computing an overall back electromotive force is depicted in the form of a flowchart in accordance with an illustrative embodiment. Process 700 illustrated in FIG. 7 may be implemented using controller 210 in FIG. 2 or controller 120 in FIG. 1. Further, process 700 may be used to implement operation 504 in process 500 in FIG. 5.

Process 700 may begin by computing a first back electromotive force for a first phase of a motor (operation 702). A second back electromotive force is computed for a second phase of the motor (operation 704). Further, a third back electromotive force is computed for a third phase of the motor (operation 706).

Thereafter, a current commutation state of the motor is identified (operation 708). In operation 708, the current commutation state of the motor is the particular commutation state in which the motor is operating at the current point in time.

An overall back electromotive force is computed for the motor based on the current commutation state and a selection of one of the first back electromotive force, the second back electromotive force, and the third back electromotive force (operation 710). In particular, in operation 710, one of the first back electromotive force, the second back electromotive force, and the third back electromotive force is selected. This selection or a negative value of this selection is used as the overall back electromotive force, depending on the current commutation state of the motor.

Figure 8:
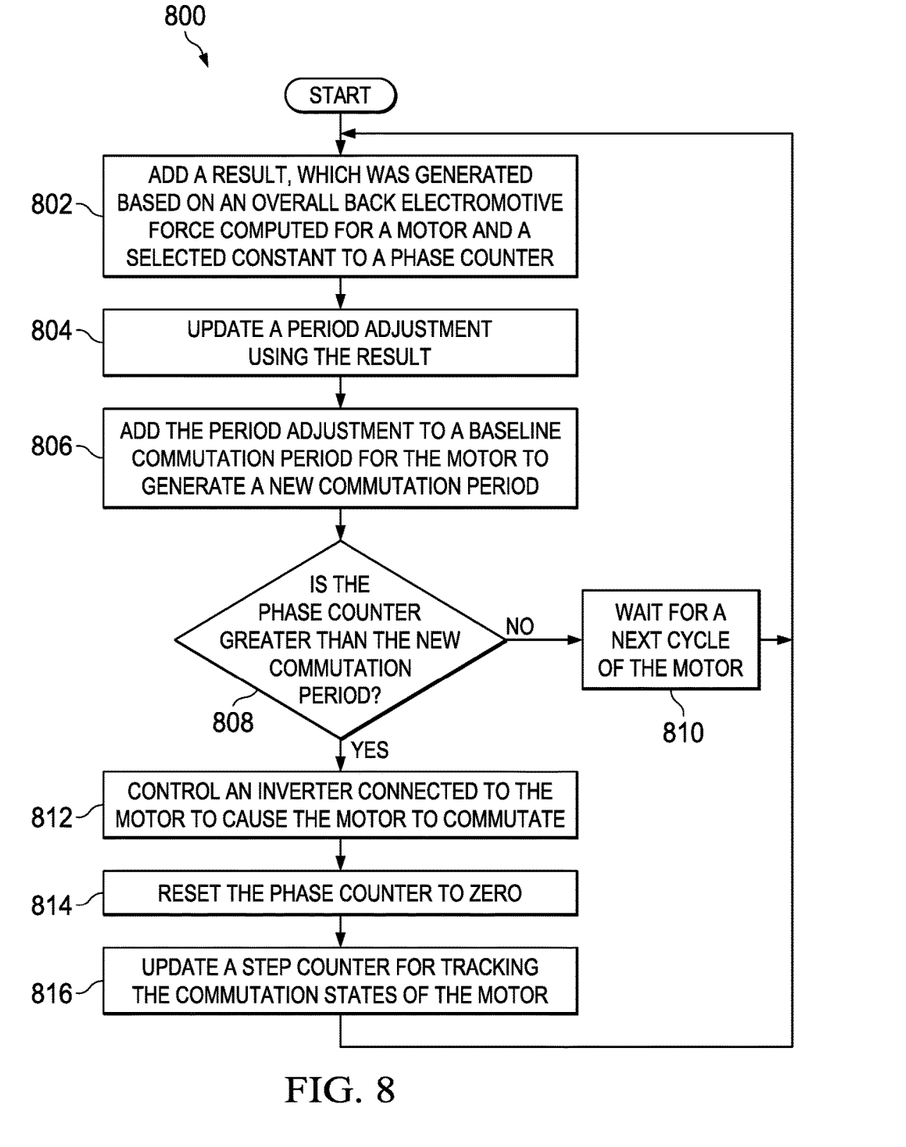
FIG. 8 is an illustration of a process for adjusting a commutation phase and a commutation period of a motor in the form of a flowchart in accordance with an illustrative embodiment.

With reference now to FIG. 8, an illustration of a process for adjusting a commutation phase and a commutation period of a motor is depicted in the form of a flowchart in accordance with an illustrative embodiment. Process 800 illustrated in FIG. 8 may be implemented using controller 210 in FIG. 2 or controller 120 in FIG. 1. Further, process 800 may be used to implement operation 508 in process 500 FIG. 5.

Process 800 may begin by adding a result, which was generated based on an overall back electromotive force computed for a motor, and a selected constant to a phase counter (operation 802). In operation 802, the overall back electromotive force may be the overall back electromotive force generated by process 700 described in FIG. 7. Further, in operation 802, the result generated based on the overall back electromotive force may be the result generated in operation 506 in FIG. 5. Further, this result may have either a first value or a second value based on the overall back electromotive force. In one illustrative example, the first value may be −1 when the overall back electromotive force is negative or equal to 0 and +1 when the overall back electromotive force is positive. Still further, in operation 802, the selected constant may be greater than the result. For example, the selected constant may be selected as 32, 36, 64, or some other constant.

Thereafter, a period adjustment is updated using the result (operation 804). In operation 804, the period adjustment is used to adjust the commutation period of the motor. In one illustrative example, the result is subtracted from the period adjustment. Thus, when the result is −1, the period adjustment is increased, which will result in the commutation period being increased and commutation possibly occurring later. But when the result is +1, the period adjustment is decreased, which will result in the commutation period being decreased and commutation possibly occurring earlier.

The period adjustment is then added to a baseline commutation period for the motor to generate a new commutation period (operation 806). Next, a determination is made as to whether the phase counter is greater than the new commutation period (operation 808).

If the phase counter is not greater than the new commutation period, process 800 then waits for a next cycle of the motor (operation 810), with process 800 then returning to operation 802 described above. However, if the phase counter is greater than the new commutation period, then an inverter connected to the motor is controlled to cause the motor to commutate (operation 812).

Thereafter, the phase counter is reset to zero (operation 814). Next, a step counter for tracking the commutation states of the motor is updated (operation 816). Process 800 then proceeds to operation 802 as described above.

Figure 9:
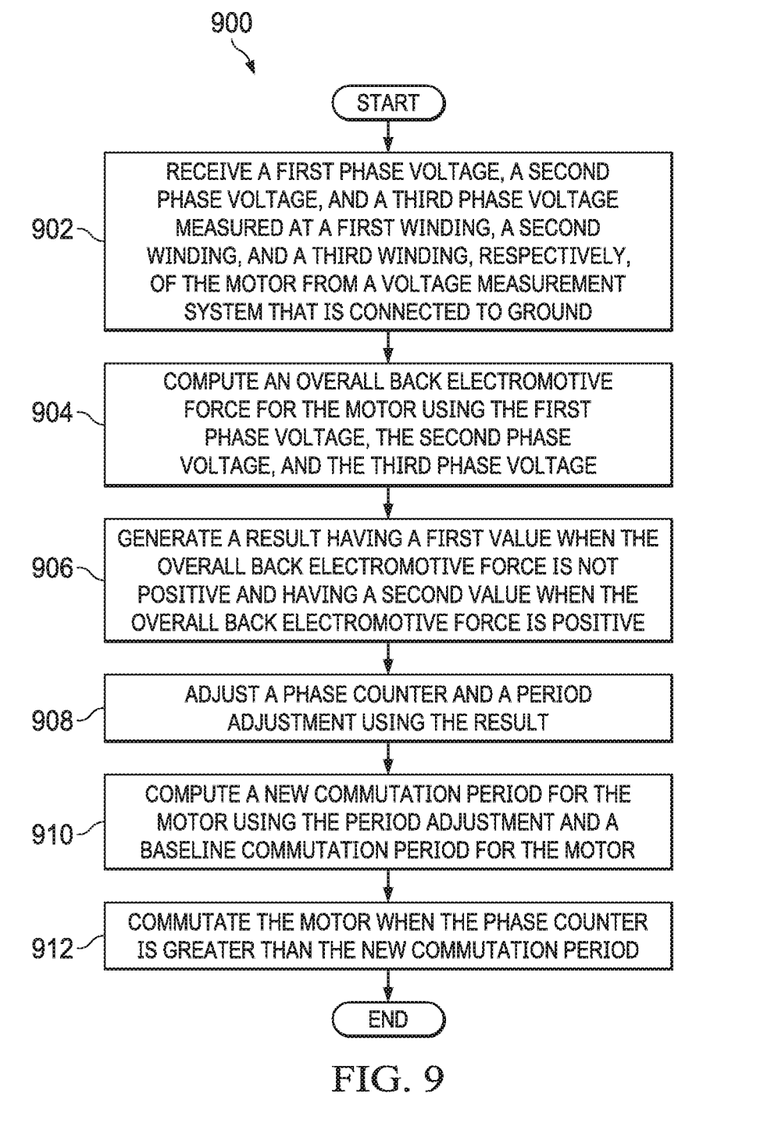
FIG. 9 is an illustration of a process for performing sensorless commutation of a motor in the form of a flowchart in accordance with an illustrative embodiment.

With reference now to FIG. 9, an illustration of a process for performing sensorless commutation of a motor is depicted in the form of a flowchart in accordance with an illustrative embodiment. Process 900 illustrated in FIG. 9 may be implemented using sensorless commutation system 204 in FIG. 2.

Process 900 may begin by receiving a first phase voltage, a second phase voltage, and a third phase voltage measured at a first winding, a second winding, and a third winding, respectively, of the motor from a voltage measurement system that is connected to ground (operation 902). Next, an overall back electromotive force for the motor is computed using the first phase voltage, the second phase voltage, and the third phase voltage (operation 904).

A result is generated having a first value when the overall back electromotive force is not positive and having a second value when the overall back electromotive force is positive (operation 906). Thereafter, a phase counter and a period adjustment are adjusted using the result (operation 908). A new commutation period for the motor is computed using the period adjustment and a baseline commutation period for the motor (operation 910). The motor is commutated when the phase counter is greater than the new commutation period (operation 912), with process 900 terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an electric circuit that measures a voltage at each of a plurality of windings of a motor; and
   a controller that is connected to the electric circuit and that:
      computes an overall back electromotive force for the motor using the voltage measured at each winding in the plurality of windings,
      generates a value based on the overall back electromotive force wherein the value is a negative value when the value is generated based on the overall back electromotive force that is negative and the value is a positive value when the value is generated based on the overall back electromotive force that is positive,
      adjusts a phase counter by adding the value and a constant to the phase counter,
      adjusts a commutation period by subtracting the value from the commutation period to generate a new commutation period,
      compares the phase counter to the new commutation period after adjusting the phase counter and the commutation period, and
      commutates the motor in response to a determination that the phase counter is greater than or equal to the new commutation period.

2. The apparatus of claim 1, wherein the controller computes a first back electromotive force for a first phase of the motor, a second back electromotive force for a second phase of the motor, and a third back electromotive force for a third phase of the motor and computes the overall back electromotive force using at least one of the first back electromotive force, the second back electromotive force, and the third back electromotive force.

3. The apparatus of claim 1, wherein the value generated by the controller is a negative one if the overall back electromotive force is negative and is a positive one if the overall back electromotive force is positive.

4. The apparatus of claim 1, wherein the controller updates a period adjustment using the value to thereby adjust a baseline commutation period of the motor.

5. The apparatus of claim 1, wherein the value is a first value when the overall back electromotive force is not positive and is a second value that is different from the first value when the overall back electromotive force is positive.

6. The apparatus of claim 5, wherein the controller causes a commutation phase of the motor to lag when the value is the first value and causes the commutation phase of the motor to advance when the value is the second value.

7. The apparatus of claim 5, wherein the controller increases the commutation period of the motor when the value is the first value and decreases the commutation period of the motor when the value is the second value.

8. The apparatus of claim 1, wherein the electric circuit comprises:
   a first voltage divider connected between an electrical ground and a first winding in the plurality of windings of the motor;
   a second voltage divider connected between the electrical ground and a second winding in the plurality of windings of the motor; and
   a third voltage divider between the electrical ground and a third winding in the plurality of windings of the motor.

9. The apparatus of claim 1, wherein the electric circuit comprises:
   an inverter comprising transistors, wherein the inverter is controlled by the controller and wherein the inverter determines when the motor is commutated.

10. The apparatus of claim 1, wherein the motor is an electric motor selected from one of a brushless direct current motor and a permanent magnet synchronous motor.

11. A method for controlling commutation of a motor, the method of comprising:
    measuring a voltage at each of a plurality of windings of the motor using an electric circuit;
    computing, by a controller, an overall back electromotive force for the motor using the voltage measured at each winding in the plurality of windings;
    generating, by the controller, a value based on the overall back electromotive force wherein the value is a negative value when the value is generated based on the overall back electromotive force that is negative and the value is a positive value when the value is generated based on the overall back electromotive force that is positive;
    adjusting, by the controller, a phase counter by adding the value and a constant to the phase counter;
    adjusting, by the controller, a commutation period by subtracting the result from the commutation period to generate a new commutation period;
    comparing the phase counter to the new commutation period after adjusting the phase counter and the commutation period; and
    commutating the motor in response to a determination that the phase counter is greater than or equal to the new commutation period.

12. The method of claim 11, wherein computing, by the controller, the overall back electromotive force comprises:

computing a first back electromotive force for a first phase of the motor;
computing a second back electromotive force for a second phase of the motor; and
computing a third back electromotive force for a third phase of the motor.

13. The method of claim 12, wherein computing, by the controller, the overall back electromotive force further comprises:
computing the overall back electromotive force using at least one of the first back electromotive force, the second back electromotive force, or the third back electromotive force based on a current commutation state of the motor.

14. The method of claim 11, wherein generating, by the controller, the value comprises:
determining whether the overall back electromotive force is positive;
generating the value as a negative value in response to a determination that the overall back electromotive force is not positive; and
generating the value as a positive value in response to a determination that the overall back electromotive force is positive.

15. The method of claim 11, wherein
the value is a first value when the overall back electromotive force is not positive; and
the value is a second value that is different from the first value when the overall back electromotive force is positive.

16. The method of claim 11, wherein adjusting, by the controller, the phase counter comprises:
adding the constant and the value to the phase counter to adjust the phase counter,
wherein the phase counter that is adjusted causes the commutation phase of the motor to lag when the overall back electromotive force is not positive; and
wherein the phase counter that is adjusted causes the commutation phase of the motor to advance when the overall back electromotive force is positive.

17. The method of claim 11, wherein adjusting, by the controller, the commutation period comprises:
updating a period adjustment for the commutation period using the value; and
using the period adjustment to adjust a baseline commutation period of the motor to compute a new commutation period.

18. The method of claim 11, wherein adjusting, by the controller, the commutation period comprises:
increasing the commutation period when the value is a first value; and
decreasing the commutation period when the value is a second value.

19. A method for performing sensorless commutation of a motor, the method comprising:
receiving, from a voltage measurement system that is connected to an electrical ground, a first phase voltage, a second phase voltage, and a third phase voltage measured at a first winding, a second winding, and a third winding, respectively, of the motor;
computing an overall back electromotive force for the motor using the first phase voltage, the second phase voltage, and the third phase voltage;
generating a first value when the overall back electromotive force is not positive and a second value when the overall back electromotive force is positive, wherein the first value is a negative value and the second value is a positive value;
updating a phase counter by decreasing the phase counter using the first value when the overall back electromotive force is not positive and by increasing the phase counter using the second value when the overall back electromotive force is positive;
updating a period adjustment by increasing the period adjustment using the first value when the overall back electromotive force is not positive and by decreasing the period adjustment using the second value when the overall back electromotive force is positive;
computing a new commutation period for the motor using the period adjustment and a baseline commutation period for the motor;
comparing the phase counter to the new commutation period; and
commutating the motor in response to a determination that the phase counter is greater than the new commutation period.

* * * * *